US012606187B2

(12) United States Patent
Mukherjee et al.

(10) Patent No.: US 12,606,187 B2
(45) Date of Patent: Apr. 21, 2026

(54) METHOD AND SYSTEM OF CONTROLLING VEHICLE OPERATIONS BASED ON UNSTATED AND STATED REQUIREMENTS OF OCCUPANTS

(71) Applicant: Wipro Limited, Bangalore (IN)

(72) Inventors: Sukalyan Mukherjee, Bangalore (IN); Debasish Chanda, Maheshtala (IN)

(73) Assignee: Wipro Limited, Bangalore (IN)

( * ) Notice: Subject to any disclaimer, the term of this patent is extended or adjusted under 35 U.S.C. 154(b) by 345 days.

(21) Appl. No.: 18/186,255

(22) Filed: Mar. 20, 2023

(65) Prior Publication Data

US 2024/0246551 A1    Jul. 25, 2024

(30) Foreign Application Priority Data

Jan. 25, 2023    (IN) .............................. 202341005218

(51) Int. Cl.
*B60W 50/10*        (2012.01)
(52) U.S. Cl.
CPC .........  *B60W 50/10* (2013.01); *B60W 2520/10* (2013.01); *B60W 2540/21* (2020.02); *B60W 2540/215* (2020.02)
(58) Field of Classification Search
CPC ............. B60W 50/10; B60W 2520/10; B60W 2540/21; B60W 2540/215; B60W 60/0013
See application file for complete search history.

(56) References Cited

U.S. PATENT DOCUMENTS

2022/0410932 A1*  12/2022  Braunstein ............  B60W 10/30
2023/0025804 A1*  1/2023  Friedland ..........  B60W 60/0057
(Continued)

FOREIGN PATENT DOCUMENTS

EP      2489566 A1    8/2012
EP      2675686 B1    8/2016
EP      3154839 A1    4/2017
(Continued)

OTHER PUBLICATIONS

Berton, A., "Magazine for Mobility and Society", https://group. mercedes-benz.com/magazine/technology-innovation/mbux-voice-assistant-hey-mercedes.html, Dec. 18, 2018, 14 pages.
(Continued)

*Primary Examiner* — James J Lee
*Assistant Examiner* — Alexander George Matta
(74) *Attorney, Agent, or Firm* — Finnegan, Henderson, Farabow, Garrett & Dunner, LLP

(57) ABSTRACT

Embodiments of present disclosure relates to method and system of controlling operations of the vehicle based on the requirements of the occupants in the vehicle. The occupant support system receives data from a plurality of sources installed in the vehicle. The occupant support system identifies one or more unstated requirements of an occupant in the vehicle based on the data. The occupant support system determines one or more changes associated with one or more operations of the vehicle, based on the one or more unstated requirements. The occupant support system determines feasibility of implementing the one or more changes for controlling the one or more operations of the vehicle. Thereafter, the occupant support system controls the one or more operations of the vehicle, based on the feasibility.

15 Claims, 4 Drawing Sheets

(56)        References Cited

U.S. PATENT DOCUMENTS

2023/0202490 A1 *   6/2023   Marzorati  .........  B60W 50/0098
                                                                        701/36
2024/0227707 A1 *   7/2024   Mankame  ..........  B60H 1/00742

FOREIGN PATENT DOCUMENTS

| EP | 3666577 | A1 | 6/2020 |
|---|---|---|---|
| KR | 20200074168 | A | 6/2020 |
| WO | 2018092436 | A1 | 5/2018 |

OTHER PUBLICATIONS https://www.mercedes-benz.com/en/innovation/connected/mbux-mercedes-benz-user-experience-revolution-in-the-cockpit/, Mar. 17, 2023, 9 pages.

* cited by examiner

100

OCCUPANT SUPPORT
SYSTEM
101

PROCESSOR
103

I/O INTERFACE
104

PLURALITY
OF
SOURCES
102

MEMORY 105

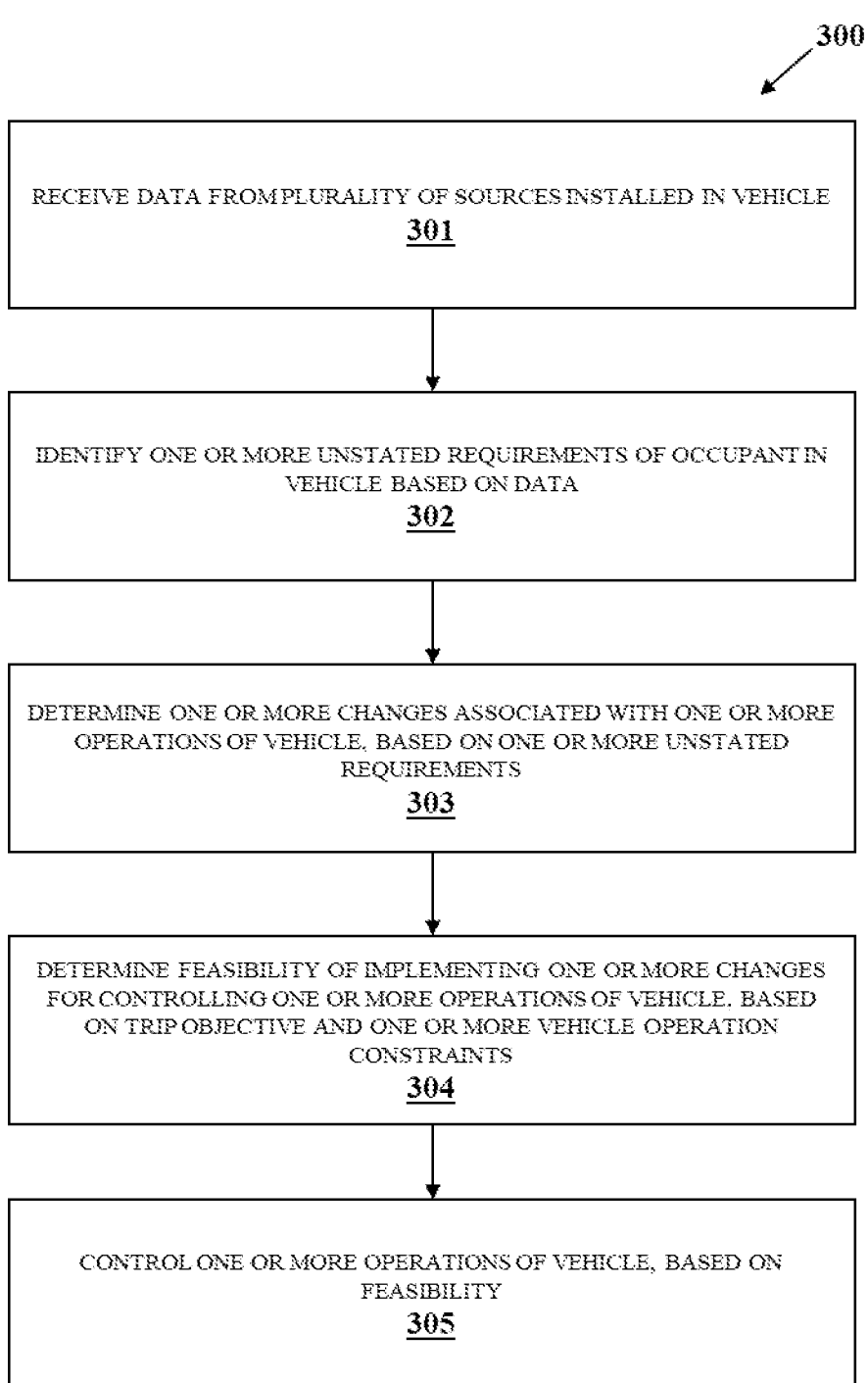

RECEIVE DATA FROM PLURALITY OF SOURCES INSTALLED IN VEHICLE
301

IDENTIFY ONE OR MORE UNSTATED REQUIREMENTS OF OCCUPANT IN VEHICLE BASED ON DATA
302

DETERMINE ONE OR MORE CHANGES ASSOCIATED WITH ONE OR MORE OPERATIONS OF VEHICLE, BASED ON ONE OR MORE UNSTATED REQUIREMENTS
303

DETERMINE FEASIBILITY OF IMPLEMENTING ONE OR MORE CHANGES FOR CONTROLLING ONE OR MORE OPERATIONS OF VEHICLE, BASED ON TRIP OBJECTIVE AND ONE OR MORE VEHICLE OPERATION CONSTRAINTS
304

CONTROL ONE OR MORE OPERATIONS OF VEHICLE, BASED ON FEASIBILITY
305

Figure 3

METHOD AND SYSTEM OF CONTROLLING VEHICLE OPERATIONS BASED ON UNSTATED AND STATED REQUIREMENTS OF OCCUPANTS

TECHNICAL FIELD

The present subject matter is related in general to vehicular operation systems, more particularly, but not exclusively, the present subject matter relates to a method and system of controlling vehicle operations based on unstated and stated requirements of occupants.

BACKGROUND

Since development of vehicles, a plethora of facilities and operations have been introduced to suit requirements of occupants, making travel for the occupants safer, easier, and substantially more comfortable. Over the years, such development has resulted in the vehicles which are sufficiently incorporated with such functionalities. However, generally, occupants are unaware with respect to operations of the vehicle during travelling and may not appropriately utilise the same based on their requirements.

Existing vehicle support systems control vehicular operations based on stated requirements of occupants, for example, an audio command to request a given song. Other presently available vehicle support systems learn user behavioural pattern (preference) and control vehicular operations based on preferences. While other presently available vehicle support systems receive stated requirements of its occupants via man-machine interface inputs like voice-based commands, touch, touchpad, gesture etc., to control vehicular operations based on the stated requirements. However, such systems are incapable of complying with unstated requirements.

In some existing systems, despite the vehicle having functionality of complying with requirements of the occupant, unawareness of the occupant with respect to functions of the vehicle results in a lack of communication between the occupant and the vehicle, such that no changes are implemented to comply with the requirements (stated or unstated). Such systems also do not anticipate unstated requirements of the occupants, which may elevate their vehicular experience. Moreover, the requirements of the occupants change over time during a travel period (i.e., during the trip). Additionally, there may be contradictory requirements amongst the occupants, requiring a trade-off among the occupants. Thus, existing vehicle support systems fail to provide mechanisms for recognizing occupants' requirements for vehicle operation support which are not explicitly communicated to vehicle systems.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of controlling operations of a vehicle based on requirements of occupants in the vehicle. The method comprises receiving data from a plurality of sources installed in the vehicle, by an occupant support system associated with the vehicle. The method comprises identifying one or more unstated requirements of an occupant in the vehicle based on the data. The identification is performed by based on a correlation of the data associated with each of the plurality of sources. Further, the method comprises determining one or more changes associated with one or more operations of the vehicle, based on the one or more unstated requirements. The method comprises determining feasibility of implementing the one or more changes for controlling the one or more operations of the vehicle. The feasibility is determined based on a trip objective and one or more vehicle operation constraints. Thereafter, the method comprises controlling the one or more operations of the vehicle, based on the feasibility.

In an embodiment, the present disclosure relates to an occupant support system for controlling operations of a vehicle based on requirements of occupants in the vehicle. The occupant support system includes a processor and a memory communicatively coupled to the processor. The memory stores processor-executable instructions, which on execution cause the processor to control operations of a vehicle based on requirements of occupants in the vehicle. The occupant support system receives data from a plurality of sources installed in the vehicle. The occupant support system identifies one or more unstated requirements of an occupant in the vehicle based on the data. The identification is performed based on a correlation of the data associated with each of the plurality of sources. The occupant support system determines one or more changes associated with one or more operations of the vehicle, based on the one or more unstated requirements. The occupant support system feasibility of implementing the one or more changes for controlling the one or more operations of the vehicle. The feasibility is based on a trip objective and one or more vehicle operation constraints. Thereafter, the occupant support system controls the one or more operations of the vehicle, based on the feasibility.

In an embodiment, the present disclosure relates to a non-transitory computer readable medium including instruction stored thereon that when processed by at least one processor cause a quality determination system to receive data from a plurality of sources installed in the vehicle. The instruction causes the processor to identify one or more unstated requirements of an occupant in the vehicle based on the data, wherein the one or more unstated requirements are identified based on a correlation of the data associated with each of the plurality of sources. The instruction causes the processor to determine one or more changes associated with one or more operations of the vehicle, based on the one or more unstated requirements. The instruction causes the processor to determine feasibility of implementing the one or more changes for controlling the one or more operations of the vehicle, based on a trip objective and one or more vehicle operation constraints. Thereafter, the instruction causes the processor to control the one or more operations of the vehicle, based on the feasibility.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

FIG. 3 illustrates a flow diagram showing exemplary method of controlling operations of a vehicle based on requirements of occupants in the vehicle, in accordance with some embodiments of present disclosure.

Figure 1:
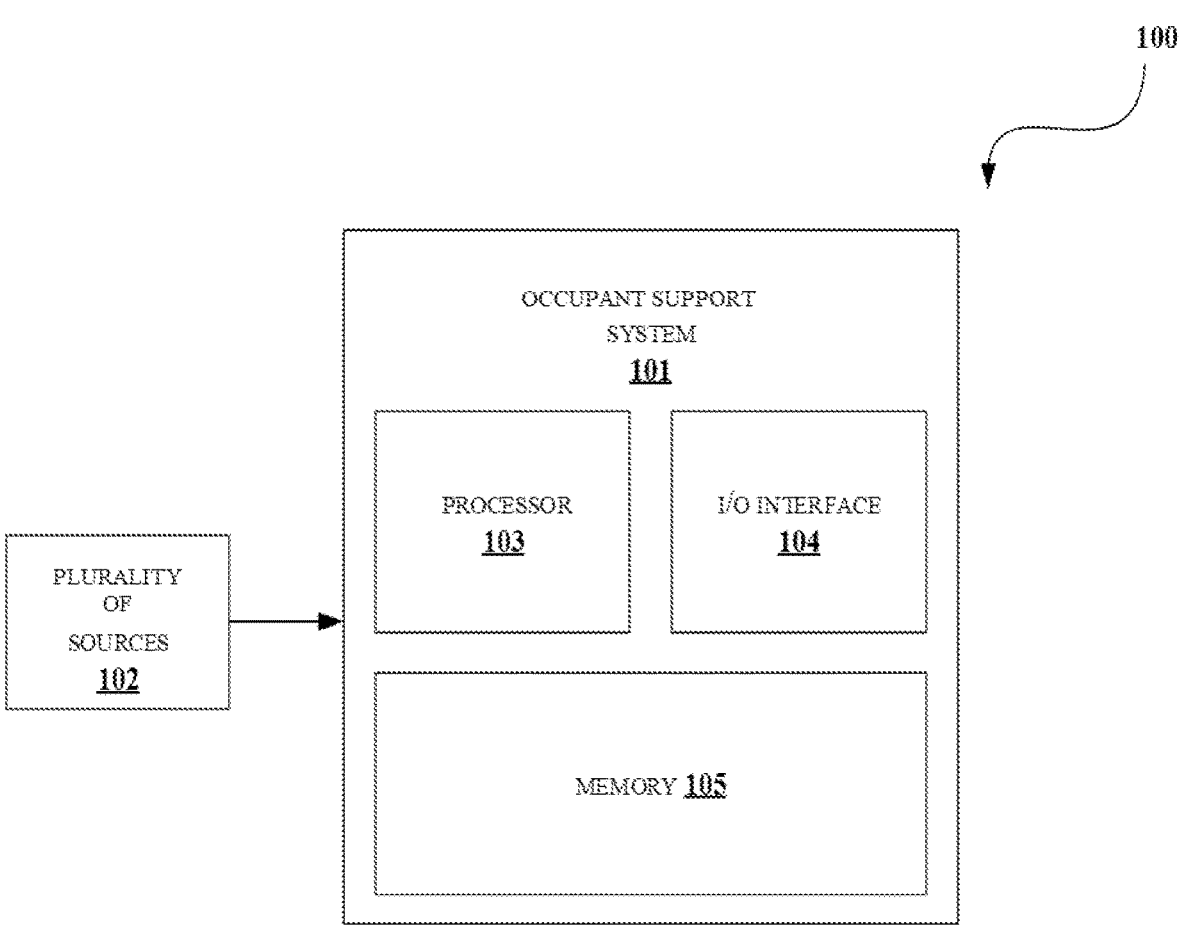
FIG. 1 shows an exemplary environment for controlling operations of a vehicle based on requirements of occupants in the vehicle, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to a method and an occupant support system of controlling operations of a vehicle based on requirements of occupants in the vehicle. Generally, occupants are unaware of operations of the vehicle during travelling and may not appropriately utilise the same based on their requirements. Presently available vehicle support systems control vehicular operations based on stated requirements of occupants, for example, an audio command to request a given song. However, such systems do not anticipate an unstated requirement of the occupants, which may elevate their vehicular experience. To overcome the above problem, the present disclosure identifies the unstated requirement of the occupants, assesses the same, and controls vehicular operation to implement one or more changes to remedy the unstated requirement. Beneficially, the present disclosure understands and addresses unstated requirements of the occupants without compromising on vehicle operation constraints and trip objective.

FIG. 1 shows an exemplary environment 100 for controlling operations of the vehicle based on requirements of occupants in the vehicle, in accordance with some embodiments of the present disclosure. As shown in FIG. 1, the exemplary environment 100 includes an occupant support system 101 and a plurality of sources 102. The occupant support system 101 may be associated with a vehicle and controls operations of the vehicle based on requirements of occupants in the vehicle. The occupants may refer to any entity which is occupying a space within the vehicle. Examples of occupants may include, but not limited to, a human, a robot, an artificially intelligent system, plants, animals, and non-living objects such as, a box of medicine, a pair of shoes, and the like. The occupants may be categorised as at least one of a driver and a passenger. The driver refers to an entity capable of driving the vehicle, and is driving the vehicle at a given time; and the passenger refers to an entity present in the vehicle and is not the driver. The driver and the passenger may be interchangeable in case such individuals are capable of driving and may drive the vehicle at different times during a trip. In an embodiment, the vehicle may include one occupant. In alternate embodiment, multiple occupants may be present in the vehicle. In such case when multiple occupants are present in the vehicle, the requirements of the occupants may be assessed in order to identify the one or more changes for controlling operations of the vehicle.

The requirements of the occupants may be at least one of a stated requirement and an unstated requirement. In an embodiment, the occupant support system 101 may be implemented within the vehicle. In another embodiment, the occupant support system 101 may be installed individually and may remotely control the operations of the vehicle based on the requirements of the occupants. In such case, the occupant support system 101 is communicably connected to the vehicle to receive data from the plurality of sources 102 to control the operations of the vehicle. The occupant support system 101 may communicate with the plurality of sources 102 via a communication network (not shown explicitly in FIG. 1). In an embodiment, the communication network may include, without limitation, a direct interconnection, Local Area Network (LAN), Wide Area Network (WAN), Controller Area Network (CAN), wireless network (e.g., using a Wireless Application Protocol), the Internet, and the like.

The occupant support system 101 may be implemented in a variety of computing systems, such as, but not limited to, a laptop computer, a desktop computer, a Personal Computer (PC), a notebook, a smartphone, a tablet, e-book readers, a server, a network server, a cloud-based server, and the like. In an embodiment, the occupant support system 101 may be a dedicated server or may be a cloud-based server. Further, the occupant support system 101 may include a processor 103, an I/O interface 104, and a memory 105. In some embodiments, the memory 105 may be communicatively coupled to the processor 103. The memory 105 stores instructions, executable by the processor 103, which, on execution, may cause the occupant support system 101 to control operations of the vehicle based on requirements of the occupants in the vehicle, as disclosed in the present disclosure.

Initially, the occupant support system 101 of the present disclosure may receive the data from the plurality of sources 102 installed in the vehicle. The plurality of sources 102 may be installed at different parts of the vehicle, based on appropriate use and function of each source of the plurality of sources 102. The data is indicative of conditions pertaining to the vehicle, including, but not limited to, a temperature of the vehicle, a speed of the vehicle, an acceleration of the vehicle, a time of day, a gesture of an occupant, a gaze of an occupant, vibration in the vehicle, sound in the vehicle, and the like.

The plurality of sources 102 comprise at least one of, but not limited to, a motion sensor, a global positioning system (GPS), a gyroscope, an accelerometer, a temperature sensor, a light sensor, a touch sensor, a gesture sensor, a microphone, a gaze sensor, a posture sensor, a camera, a haptic sensor, an air pressure sensor, and the like.

The occupant support system 101 may identify one or more unstated/stated requirements of the occupant in the vehicle based on the data. The one or more unstated requirement may refer to a requirement which is not explicitly expressed or stated by the occupant. Optionally, the occupant is unaware of the unstated requirement. The data is indicative of the requirements of the occupants, including the stated requirement and the unstated requirement. In an example, an unstated requirement of the occupant may be to slightly lower the temperature of the vehicle. Herein, high temperature may be causing the occupant discomfort which may not have been realised. In another example, the stated requirement of the occupant may be to slightly lower the temperature of the vehicle. Herein, the occupant may have gestured indicating to be warm. It will be appreciated that requirements which may be explicitly stated by the occupant may be considered the stated requirement. Such explicit stating may include, but not be limited to, a gesture, an audio command, a request made to a co-occupant, a verbal mention, a gaze, an intentional expression. Contrastingly, the unstated requirement may be indicated by at least one of a posture, an unintentional expression, a sound, a movement, a jerk, an increase in heart rate (in case of living occupants). For example, an unstated medical requirement of the occupant may be identified based on a breathing pattern, a blood pressure, a heart rate, and general health-related knowledge of the occupant.

The one or more unstated requirements of the occupants may be identified based on a correlation of the data received from each of the plurality of sources 102. The data may include monitoring data from the plurality of sources 102. In an embodiment, the monitoring data refers to data collected while monitoring at least one of, the vehicle, environment in the vehicle, and occupant. The data may also include occupant information, one or more vehicle operation constraints, a trip context, a vehicle operation context, and the like. The trip context is created using at least one of a trip objective, and a trip destination; wherein the trip context contains at least one of route information, and estimated time left for the trip. The vehicle operation context contains at least one of a current state of fuel/charge, a vehicle model/brand, a current state of comfort mechanism. A person skilled in the art would understand that the vehicle operation context may include any other information apart from the ones mentioned above. In an embodiment, data associated with each of the plurality of sources 102 may be fused to create fusion data. The data associated with each of the plurality of sources 102 is correlated to identify the one or more unstated requirements. Particularly, the occupant support system 101 identifies at least one cue pertaining to the occupants.

The at least one cue refers to a word or movement that act as a signal for the one or more unstated requirements. Examples of the at least one cue include, but not limited to, an improper temperature, an inaccurate speed, excessive jerking, a posture or position of the occupant, an expression of the occupant, and so forth. The at least one cue is indicative of at least one of a behavioural parameter, a temporal parameter, and a conditional parameter. The behavioural parameter refers to a parameter that pertains to exhibition of a behaviour of the occupant in the vehicle. Examples of the behavioural parameter includes, but not limited to, inaccurate posture or position, excessive jerking of the occupant, vision-related issues, hearing-related issues, motor-related issues (such as limb movement), fatigue issues, drowsiness, health hazard (such as low blood sugar), state of mind, level of engagement, difficulty in task completion, absent mindedness, and so forth. The temporal parameter refers to a parameter that pertains to a real-world environment of the vehicle. Examples of the temporal parameter includes, but not limited to, temperature (inside and outside the vehicle), air pressure (inside and outside the vehicle), moisture content (inside and outside the vehicle), ambient visibility level, ambient temperature level, ambient noise level, and the like. The conditional parameter refers to a parameter that may be indicated as a 'condition' in the trip objective, for example, temperature of the vehicle to be maintained at −4° C. at all times since the occupant may be a medicine which requires temperature control. The at least one cue may be associated with a cue description, wherein the cue description pertains to at least one of a cue name, a cue source, a level of severity, a priority rating, and the like.

For instance, consider the at least one cue may be increasing body temperature of the occupant with light perspiration. Herein, the data may be indicative of the increasing body temperature and the perspiration of the occupant. In this example, two sets of data, i.e., one indicating the increasing body temperature, and another indicating the perspiration, may be collected from two sources such as, a temperature sensor and a camera. The two sets of data may be correlated to identify the at least one cue, which is the occupant having a high body temperature and light perspiration. For instance, since the perspiration is light, the occupant may not have acknowledged it themselves. This cue of the occupant having high body temperature and light perspiration indicates that the occupant is feeling hot, which is identified as the one or more unstated requirement of the occupant.

In an embodiment, the occupant support system 101 identifies the one or more stated requirements of the occupant. Herein, the occupant support system 101 identifies one or more stated requirements by processing the data. The data is also indicative of the one or more stated requirements. For example, an audio recording may include a comment from the occupant to reduce the speed of the vehicle. Further, the occupant support system 101 controls the one or more operations of the vehicle based on the one or more stated requirements. With respect to the above example, since the one or more stated requirements is to reduce the speed, the occupant support system 101 may control the one or more operations of the vehicle to reduce the speed of the vehicle.

Further, the occupant support system 101 may determine one or more changes associated with one or more operations of the vehicle, based on the one or more unstated requirements. The one or more changes may be implemented in the vehicle to alter the one or more operations of the vehicle. The one or more changes include, but are not limited to, altering a temperature, altering a speed/acceleration, altering an orientation, altering illumination, altering air pressure, altering moisture content, altering display or sound, and the like within the vehicle. The one or more changes may be determined from a pre-defined list of changes, retrieved from the memory 105 associated with the occupant support system 101. The pre-defined list of changes refers to a list of possible changes which may be implemented based on a corresponding requirement, or a corresponding cue. It will be appreciated that a plurality of operations of the vehicle may be associated with a single change, and vice versa, and a plurality of changes may be associated with a single operation of the vehicle, in order to comply with the one or more unstated requirements.

In an exemplary implementation, the pre-defined list of changes may be defined in conjunction with the at least one cue. For instance, a first cue of jerking movement in a seat causing severe discomfort for the occupant may be associated with possible changes of reducing the speed and/or adjusting the seat of the occupant by controlling its pneumatic control. A second cue of improper humidity inside the vehicle due to fatigue of the occupant may be associated with possible changes of controlling an air conditioning (AC) unit and/or considering a charge left in the vehicle to control the AC unit optimally. A third cue of drowsiness of the occupant may be associated with possible changes of engaging the occupant using information/entertainment via a speaker or a display and/or activating the speaker or the display based on a position of the occupant within the vehicle. A fourth cue of vision difficulty experienced by the occupant may be associated with possible changes of controlling interior illumination in the vehicle, and/or controlling exterior illumination to achieve a better field of view (FOV).

The one or more changes are identified from the pre-defined list of changes based on a predefined rule set. The predefined rule set refers to a dynamic set of predefined rules, which assist in identifying the one or more changes from the pre-defined list of changes. The predefined rules determine a possibility of the one or more changes pertaining to the one or more unstated requirements. With respect to the above example, a predefined rule may be that increased body temperature may relate to high environmental temperature. Based on this, the one or more changes identified may be to lower the temperature in the vehicle. The predefined rule set may be dynamically updated based on feedback of a user (discussed below in more detail). The user may be at least one of the occupant, an entity which monitors and utilises the occupant support system 101 (need not be occupant).

The one or more operations include, but are not limited to, a speed of the vehicle, an acceleration of the vehicle, an orientation of the vehicle, a mode of the vehicle, an air pressure in the vehicle, a temperature in the vehicle, an illumination in the vehicle, a moisture content in the vehicle, a display or sound provided in the vehicle. The one or more changes may be utilised for complying with the one or more unstated requirements. With reference to the above example, the unstated requirement of the occupant of feeling hot/warm is assessed with respect to the pre-defined list of changes to determine the one or more change. Herein, the one or more change may be reducing a temperature of the vehicle, and the one or more operation may be adjusting the temperature by controlling an air conditioner of the vehicle.

Furthermore, the occupant support system 101 may determine feasibility of implementing the one or more changes for controlling the one or more operations of the vehicle. It will be appreciated that feasibility refers to possibility that can be made, performed, or achieved, or is reasonable. Herein, implementation of the one or more changes depends on the vehicle, and functionality thereof. For example, a change of 'roll down window to allow air ventilation' may not be feasible to implement in a vehicle of old make and model, having manual window roll-down. The one or more changes for controlling the one or more operations of the vehicle may be implemented only when the one or more changes are feasible to be implemented. If the one or more changes are not feasible of being implemented for controlling the one or more operations of the vehicle, the one or more changes are not implemented. In such cases, alternatives to the one or more changes may be implemented. With respect to the above example, an alternative might be to provide a suggestion for rolling down window to allow air ventilation via a speaker, and/or using a voice assistant.

The feasibility of implementing the one or more changes is determined based on the trip objective and one or more vehicle operation constraints. The trip objective refers to an objective assigned to a trip of the vehicle. The trip objective is received from the user associated with the vehicle, prior to initialisation of the trip in the vehicle. The trip refers to a journey from one physical location to another. It will be appreciated that the trip pertains to the vehicle, which means that, each trip is governed by vehicular operations, and therefore is unique for each vehicle. For instance, a trip from London to Edinburgh, carried out by different vehicles, would result in different trips, since vehicle characteristics and operations affect the trip. The vehicle may be associated with a plurality of trips at different times.

The trip objective comprises at least one of a trip destination, a trip time, an average trip speed, details of the occupant, and pre-defined parameters. The pre-defined parameters refer to parameters which are pre-defined prior to initialisation of the trip. Examples of the pre-defined parameters include maintaining a minimum ambient temperature (for transporting a medical drug), maintaining a minimum SpO2 level (for transporting a patient), maintaining a maximum tolerable jerking (for specific occupants), and so forth. Optionally, the user may determine the trip objective based on the pre-defined parameters. In an embodiment, when determining the feasibility of implementing the one or more changes, the trip objective may be prioritised over low-priority requirements of the occupants (for example, changing a song).

Likewise, the occupant support system 101 may assess the one or more stated requirements for the feasibility of implementation in the vehicle prior to controlling the one or more operations of the vehicle. Similar to determination of feasibility of implementation of the one or more unstated requirements, the one or more stated requirements are assessed with respect to the trip objective and the one or more vehicle operation constraints to assess the feasibility of implementation of the one or more stated requirements. With respect to the above example explained for the stated requirements, a current speed of the vehicle may be compared with a minimum and a maximum speed limit (set internally by manufacturers/proprietors of the vehicle from the one or more vehicle operation constraints, and set externally by traffic authorities from the trip objective).

The one or more vehicle operation constraints refer to limitations in controlling the one or more operations of the vehicle. Examples of the one or more vehicle operation constraints include presence and/or absence of a heater/blower, the AC unit, an automatic window control, an automatic locking mechanism, a vehicle speed limit (both minimum and maximum), a radio, a display, a speaker, a microphone, and the like.

Thereafter, the occupant support system 101 controls the one or more operations of the vehicle, based on the feasibility. The occupant support system 101 may control the one or more operations to implement the one or more changes. The one or more operations of the vehicle are either controlled remotely (in cases where the occupant support system 101 is not installed within the vehicle), or from within the vehicle (in cases where the occupant support system 101 is installed within the vehicle). It will be appreciated that the one or more operations of the vehicle are controlled, when it is determined that the one or more changes are feasible to be implemented.

Optionally, when it is determined that the one or more changes are not feasible, the one or more changes are optimised, such that post optimisation, the one or more changes are feasible. The optimization may include identifying a possible change, which is similar to the one or more changes but also maps with the trip context and the vehicle operation constraints. In an example, the one or more changes may be to 'roll down window to allow air ventilation', and due to vehicle operation constraints (i.e., manual windows), the one or more changes are not feasible to be implemented. Herein, the one or more changes may be optimised to suit the one or more vehicle constraints and/or the trip objective. In this example, since the vehicle has manual windows, a voice assistant of the vehicle may be controlled to announce, 'please roll down your window to allow air ventilation'. This audio announcement may prompt the occupant to manually implement the one or more changes, improving the air ventilation within the vehicle.

Further, the occupant support system 101 assesses and improves the performance based on the one or more changes performed in the vehicle. Herein, the performance refers to an accuracy of implementing the one or more changes to comply with the one or more unstated/or stated requirements. In an embodiment, if the one or more unstated/stated requirements cease to exist after implementation of the one or more changes by controlling the one or more operations of the vehicle, then the performance is considered to be optimal. In an embodiment, the performance of the occupant support system 101 is determined based on feedback from the user. In another embodiment, the performance may be measured with respect to metrics, ranking, or relativity, based on a qualitative assessment.

Particularly, the occupant support system 101 identifies one or more factors influencing the performance of the occupant support system 101, based on the one or more operations of the vehicle and the trip objective. For example, the vehicle is travelling at 60 km/hr, and a requirement of the occupant is identified to maintain low speed, since the occupant may get anxious at high speed. The trip objective may require the vehicle to reach a destination by a given time. Since the requirement is in contrast with the trip objective, the one or more changes implemented is reducing the speed to 50 km/hr. In this example, the one or more factors influencing the performance of the occupant support system 101 may be a delayed arrival time. Thereon, the performance of the occupant support system 101 is assessed, based on the one or more changes. With respect to the example, since the one or more factors influencing the performance is the delayed arrival time, it is assessed that based on the one or more changes, the trip objective may not be met, and therefore the performance is assessed as 'poor'. The performance of the occupant support system 101 is improved, based on the one or more factors, when the performance is less than a predefined threshold. The predefined threshold refers to a minimum requirement of the performance, based on the measurement of the same. With respect to the example, the predefined threshold of the performance is 'fair'. Since 'poor' is relatively lower than 'fair', the performance is required to be improved. Herein, the one or more changes may be updated to reflect an increased speed of 55 km/hr, which satisfies the trip objective and the requirement of the occupant, improving the performance to 'good'. In an embodiment, the performance of the occupant support system 101 may be constantly assessed and improved, in order to reduce possibilities of false or inaccurate determination of the one or more changes.

In an embodiment, the occupant support system 101 may dynamically update the predefined rule set, based on an assessment of the performance of the occupant support system 101. Herein, once the one or more changes have been implemented at the occupant support system 101, the performance (as assessed) is indicative of an accuracy of implementation of the one or more changes. In other words, the performance indicates appropriateness of the one or more changes, in light of the one or more unstated/stated requirements of the occupant. If, in such cases, the performance is different than a previous performance for a same or similar unstated/stated requirement, the predefined rule set may be dynamically updated to signify the same. With respect to the above example, the predefined rule set may be dynamically updated to reflect that reducing the speed to 50 km/hr is an inappropriate selection and that increasing the speed to 55 km/hr may be an appropriate selection for the one or more changes, at respective time instances.

Figure 2:
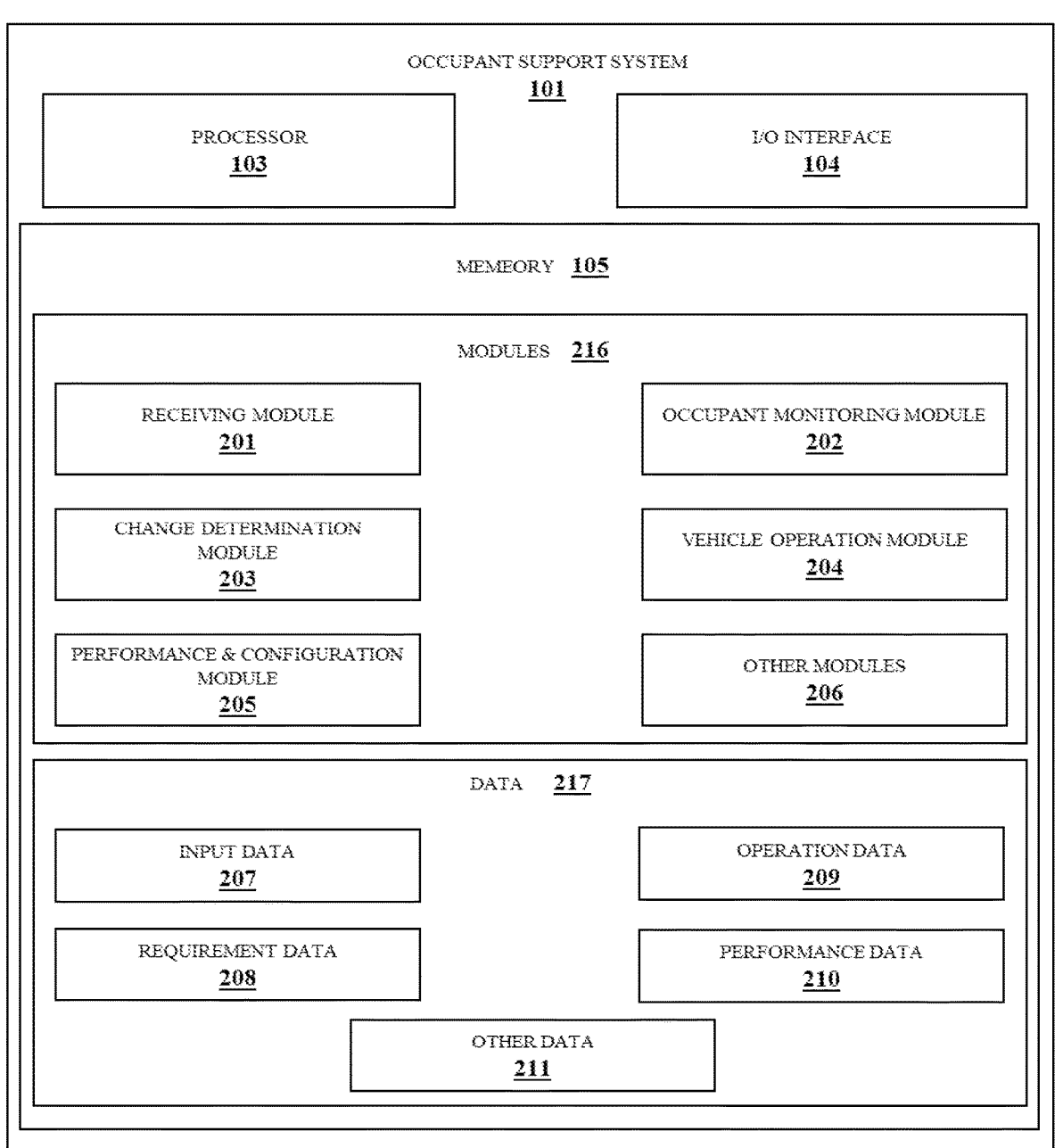
FIG. 2 shows a detailed block diagram of an occupant support system of controlling operations of a vehicle based on requirements of occupants in the vehicle, in accordance with some embodiments of the present disclosure.

FIG. 2 shows a detailed block diagram of an occupant support system 101 of controlling operations of a vehicle based on requirements of occupants in the vehicle, in accordance with some embodiments of the present disclosure.

Data 217 and one or more modules 216 in the memory 105 of the occupant support system 101 is described herein in detail.

In one implementation, one or more modules 216 may include, but are not limited to, a receiving module 201, an occupant monitoring module 202, a change determination module 203, a vehicle operation module 204, a performance and configuration module 205, and other modules 206, associated with the occupant support system 101.

In an embodiment, the data 217 in the memory 105 may include input data 207, requirement data 208, operation data 209, performance data 210, and other data 211 associated with the occupant support system 101. The input data 207 may include data from the plurality of sources 102. The data is indicative of the requirements of the occupants, including the stated requirement and the unstated requirement, the vehicle operation context, the trip context, and the like.

The requirement data 208 may include information regarding the one or more unstated/stated requirements of the occupant in the vehicle, the at least one cue, and the like.

The operation data 209 may include information regarding the one or more operations of the vehicle and the one or more changes associated with the one or more operations of the vehicle. Examples of the one or more operations of the vehicle include, but are not limited to, an air conditioner, a speed, an acceleration, a seat position, a seat height, a seat orientation, a direction of the vehicle, a speaker in the vehicle, a display inside the vehicle. Respectively, examples of the one or more changes include, but are not limited to, adjusting a temperature of the vehicle, adjusting the speed or the acceleration, adjusting the seat position, the seat height, or the seat orientation, adjusting the direction of the vehicle, providing a particular sound or visual for the speaker or the display inside the vehicle.

The performance data 210 may include information regarding the performance of the occupant support system 101, and the one or more factors influencing the performance of the occupant support system. This information may include trip statistics based on data collected during the trip, vehicle performance, and the like. The one or more factors influencing the performance may pertain to vehicular constraints, speed limits, unexpected halts, unexpected traffic/diversion, and the like.

The other data may store data, including temporary data and temporary files, generated by modules for performing the various functions of the occupant support system 101.

In an embodiment, the data 217 in the memory 105 may be processed by the one or more modules 216 of the occupant support system 101. The one or more modules 216 may be configured to perform the steps of the present disclosure using the data 217, for controlling operations of the vehicle based on the requirements of the occupants in the vehicle. In an embodiment, each of the one or more modules 216 may be a hardware unit which may be outside the memory 105 and coupled with the occupant support system 101. In an embodiment, the one or more modules 216 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

One or more modules 216 of the occupant support system 101 function to control operations of the vehicle based on the requirements of the occupants in the vehicle. The one or more modules 216 along with the data 217, may be implemented in any system, for controlling operations of the vehicle based on the requirements of the occupants in the vehicle.

The receiving module 201 may receive the input data 207 from the plurality of sources 102 installed in the vehicle. The plurality of sources 102 comprise at least one of a motion sensor, a global positioning system (GPS), a gyroscope, an accelerometer, a temperature sensor, a light sensor, a touch sensor, a gesture sensor, a microphone, a gaze sensor, a posture sensor, a camera, a haptic sensor, an air pressure sensor, and the like. Based on an implementation of the plurality of sources 102, the input data 207 may pertain to at least one of motion information, location information, orientation information, speed or acceleration information, temperature information, light information, touch information, gesture information, audio information, gaze information, posture information, visual information, haptic information, air pressure information, and the like. The occupant support system 101 may utilise the input data 207 for identifying the one or more unstated/stated requirements of the occupant in the vehicle.

The occupant monitoring module 202 may identify the one or more unstated and stated requirements of the occupant in the vehicle, based on the input data 207. The occupant monitoring module 202 may identify the one or more unstated requirements of the occupants in the vehicle based on a correlation of the input data 207 associated with each of the plurality of sources 102. Particularly, for identifying the one or more unstated requirements of the occupant, the occupant monitoring module 202 may firstly detect at least one cue pertaining to the occupant, based on the input data 207. The at least one cue is indicative of at least one of the behavioural parameter, the temporal parameter, and the conditional parameter. Secondly, the occupant monitoring module 202 determines the one or more unstated requirements of the occupant, based on the at least one cue. For example, the at least one cue may indicate a temperature inside the vehicle, or a twitch in a face of the occupant.

The change determination module 203 may determine one or more changes associated with one or more operations of the vehicle, based on the one or more unstated/stated requirements. The one or more changes may be implemented in the vehicle to alter the one or more operations of the vehicle to comply with the one or more unstated requirements. The change determination module 203 may determine one or more changes by identifying the one or more changes from a pre-defined list of changes. The change determination module 203 may retrieve the pre-defined list of changes from the memory 105 associated with the occupant support system 101. Moreover, the change determination module 203 may determine one or more changes by identifying the one or more changes from the pre-defined list of changes by mapping the one or more changes using a predefined rule set. The predefined rule set refers to a dynamic set of predefined rules, which assist in identifying the one or more changes from the pre-defined list of changes. Moreover, the predefined rule set is stored at the memory 105, and is dynamically updated at the memory 105 based on the feedback of the user.

The vehicle operation module 204 may determine feasibility of implementing the one or more changes for controlling the one or more operations of the vehicle, based on the trip objective and the one or more vehicle operation constraints. The vehicle operation module 204 may determine the feasibility by correlating the one or more changes with the trip objective and the one or more vehicle operation constraints. The vehicle operation module 204 may implement the one or more changes for controlling the one or more operations of the vehicle only when the one or more changes are feasible to be implemented.

Further, the vehicle operation module 204 may control the one or more operations of the vehicle, based on the feasibility. The vehicle operation module 204 may control the one or more operations to implement the one or more changes. The vehicle operation module 204 may control the one or more operations of the vehicle either remotely (in cases where the occupant support system 101 is not installed within the vehicle), or from within the vehicle (in cases where the occupant support system 101 is installed within the vehicle).

The vehicle operation module 204 optionally identifies the one or more stated requirements of the occupant, and controls the one or more operations of the vehicle based on the one or more stated requirements. In an example, the stated requirement is identified from audio data of the vehicle, of an occupant requesting to stop. In this example, a global positioning system (GPS) operation of the vehicle may be controlled to find and select a closest rest stop on the way, where the vehicle may stop.

The performance and configuration module 205 may assess and improve the performance of the occupant support system 101, based on the one or more changes performed in the vehicle. Herein, the performance and configuration module 205 identifies the one or more factors influencing the performance of the occupant support system 101, by correlating the one or more operations of the vehicle with the trip objective. Thereon, the performance and configuration module 205 assesses the performance of the occupant support system 101, based on the one or more changes. For example, if a trip is delayed by 30 minutes, the one or more factors influencing the performance (which is a delay of 30 minutes) may be influenced by heavy traffic, or unexpected bad weather conditions.

The performance and configuration module 205 improves the performance of the occupant support system 101, based on the one or more factors, when the performance is less than a predefined threshold.

The one or more modules 216 may also include other modules 206 such as a rule set module, an initialisation module, and an interface module to perform various miscellaneous functionalities of the occupant support system 101. The rule set module may dynamically update the pre-defined rule set, based on the feedback received from the user. Such dynamic updating ensures that the pre-defined rule set is relevant and useful, resulting in gradual improvement in the performance of the occupant support system 101. The initialisation module may be utilised to initialise the trip, including receiving trip instructions from the user. The interface module may act as an interface between the user and the occupant support system 101, facilitating the user to interact with the occupant support system 101.

FIG. 3 illustrates a flow diagram showing exemplary method of controlling operations of a vehicle based on requirements of occupants in the vehicle, in accordance with some embodiments of present disclosure.

As illustrated in FIG. 3, the method 300 may include one or more blocks for executing processes in the occupant support system 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, receiving, by the receiving module 201, the data 207, from the plurality of sources 102 installed in a vehicle. The plurality of sources 102 comprise at least one of a motion sensor, a global positioning system (GPS), a gyroscope, an accelerometer, a temperature sensor, a light sensor, a touch sensor, a gesture sensor, a microphone, a gaze sensor, a posture sensor, a camera, a haptic sensor, an air pressure sensor. Based on an implementation of the plurality of sources 102, the data 217 may pertain to at least one of: motion information, location information, orientation information, speed or acceleration information, temperature information, light information, touch information, gesture information, audio information, gaze information, posture information, visual information, haptic information, air pressure information.

At block 302, identifying, by the occupant monitoring module 202, the one or more unstated requirements of the occupant in the vehicle, based on the data 207. The data 207 is indicative of the requirements of the occupants, including the stated requirement and the unstated requirement. The identification of the one or more unstated requirements comprises identifying the one or more unstated requirements based on a correlation of the data 207 associated with each of the plurality of sources 102. Particularly, the occupant monitoring module 202 may detect at least one cue pertaining to the occupant, based on the data 207. The at least one cue is indicative of at least one of a behavioural parameter, a temporal parameter, and a conditional parameter. Further, the occupant monitoring module 202 may determine the one or more unstated requirements of the occupant, based on the at least one cue.

At block 303, determining, by the change determination module 203, one or more changes associated with one or more operations of the vehicle, based on the one or more unstated requirements. Particularly, the change determination module 203 may identify the one or more changes from a pre-defined list of changes for complying with the one or more unstated requirements, based on a predefined rule set. Moreover, the pre-defined list of changes is retrieved by the change determination module 203 from the memory 105 associated with the occupant support system 101.

At block 304, determining, by the vehicle operation module 204, feasibility of implementing the one or more changes for controlling the one or more operations of the vehicle, based on a trip objective and one or more vehicle operation constraints. The vehicle operation module 204 may implement the one or more changes for controlling the one or more operations of the vehicle only when the one or more changes are feasible to be implemented.

At block 305, controlling, by the vehicle operation module 204, the one or more operations of the vehicle, based on the feasibility. The vehicle operation module 204 may control the one or more operations of the vehicle either remotely (in cases where the occupant support system 101 is not installed within the vehicle), or from within the vehicle (in cases where the occupant support system 101 is installed within the vehicle).

Exemplary Embodiment

In an exemplary embodiment, consider the occupant to be a non-living thing, for example, a medicine. Herein, data is received from a temperature sensor installed in the vehicle.

The data is indicative of a temperature inside the vehicle. Since the occupant is the medicine and the data also includes vehicle operation context and trip context, the temperature requirement may be mentioned in the trip context and may be identified as an unstated requirement. The temperature requirement may be mapped with the temperature inside the vehicle to check whether appropriate temperature is being maintained. If the temperature inside the vehicle is inappropriate, then the temperature inside the vehicle may be adjusted by controlling an air conditioner of the vehicle. Thereafter, a feasibility of adjusting the temperature is determined based on the trip objective and the one or more vehicle operation constraints. The feasibility of implementing refers to a possibility of implementing one or more changes in the vehicle. In this case, the temperature inside the vehicle cannot be adjusted if the vehicle does not have a functioning air conditioner. If it is determined that the vehicle has the functioning air conditioner, then the air conditioner of the vehicle is controlled to adjust the temperature inside the vehicle.

Figure 4:
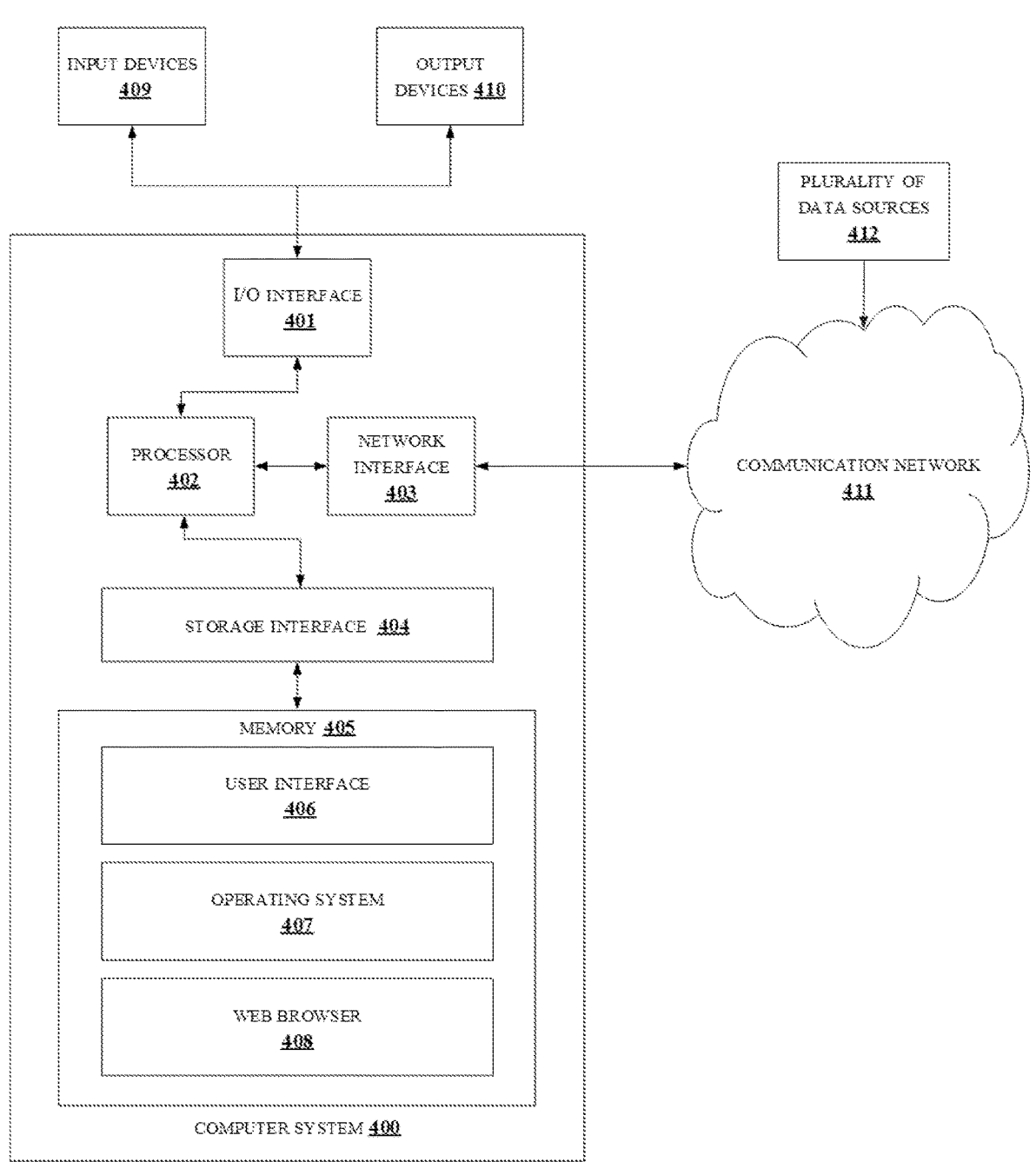
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 is used to implement the occupant support system 101. The computer system 400 may include a central processing unit ("CPU" or "processor") 402. The processor 402 may include at least one data processor for executing processes in Virtual Storage Area Network. The processor 402 may include specialized processing units such as, integrated system (bus) controllers, memory management control units, floating point units, graphics processing units, digital signal processing units, etc.

The processor 402 may be disposed in communication with one or more input/output (I/O) devices 409 and 410 via I/O interface 401. The I/O interface 401 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices 409 and 410. For example, the input devices 409 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 410 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 400 may consist of the occupant support system 101. The processor 402 may be disposed in communication with the communication network 411 via a network interface 403. The network interface 403 may communicate with the communication network 411. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 411 may include, without limitation, a direct interconnection, local area network (LAN), wide area network (WAN), wireless network (e.g., using Wireless Application Protocol), the Internet, etc. Using the network interface 403 and the communication network 411, the computer system 400 may communicate with the plurality of sources 412 for controlling operations of the vehicle based on the requirements of the occupants in the vehicle. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 411 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407 etc. In some embodiments, computer system 400 may store user/application data 406, such as, the data, variables, records, etc., as described in this disclosure. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™ VISTA™/7/8, 10 etc.), APPLE® IOS™, GOOGLER ANDROID™, BLACKBERRY® OS, or the like.

In some embodiments, the computer system 400 may implement a web browser 408 stored program component. The web browser 408 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browser 408 may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as ASP, ActiveX, ANSI C++/C #, Microsoft .NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provisions a method and system of controlling vehicle operations based on unstated and stated requirements of occupants. The present disclosure instantly identifies the one or more unstated requirements of the occupant.

An embodiment of the present disclosure determines the one or more changes to comply with the one or more unstated requirements.

An embodiment of the present disclosure determines the feasibility of implementing the one or more changes associated with the one or more operations of the vehicle without compromising on the trip objective and the one or more vehicle operation constraints.

An embodiment of the present disclosure controls the one or more operations of the vehicle to implement the one or more changes, if the same are feasible to be implemented.

An embodiment of the present disclosure improves accuracy of the occupant support system. This is achieved by identifying the one or more factors influencing the performance, assessing the performance, and improving the performance of the occupant support system based on the one or more factors.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMS, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art. The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention. When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself. The illustrated operations of FIG. 3 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

| Referral Numerals: | |
| --- | --- |
| Reference Number | Description |
| 100 | Environment |
| 101 | Occupant support system |
| 102 | Plurality of sources |
| 103 | Processor |
| 104 | I/O interface |
| 105 | Memory |
| 216 | Modules |
| 217 | Data |
| 201 | Receiving module |
| 202 | Occupant Monitoring module |
| 203 | Change Determination module |
| 204 | Vehicle Operation module |
| 205 | Performance & Configuration module |
| 206 | Other modules |

What is claimed is:

1. A method of controlling operations of a vehicle based on requirements of occupants in the vehicle, the method comprising:

receiving, by an occupant support system associated with the vehicle, data from a plurality of sources installed in the vehicle;

identifying, by the occupant support system, one or more unstated requirements of an occupant in the vehicle based on the data, wherein the one or more unstated requirements are identified based on a correlation of the data associated with each of the plurality of sources;

determining, by the occupant support system, one or more changes associated with one or more operations of the vehicle, based on the one or more unstated requirements;

determining, by the occupant support system, feasibility of implementing the one or more changes for controlling the one or more operations of the vehicle, based on a trip objective and one or more vehicle operation constraints; and controlling, by the occupant support system, the one or more operations of the vehicle, based on the feasibility; and assessing and improving performance of the occupant support system, based on the one or more changes performed in the vehicle, wherein assessing and improving the performance of the occupant support system comprises:

identifying one or more factors influencing the performance of the occupant support system, based on the one or more operations of the vehicle and the trip objective;

assessing the performance of the occupant support system, based on the one or more changes; and improving the performance of the occupant support system, based on the one or more factors, when the performance is less than a predefined threshold.

2. The method as claimed in claim 1, wherein controlling the one or more operations of the vehicle comprises:

optionally identifying one or more stated requirements of the occupant; and controlling the one or more operations of the vehicle based on the one or more stated requirements.

3. The method as claimed in claim 2, wherein the one or more stated requirements are assessed for the feasibility of implementation in the vehicle prior to controlling the one or more operations of the vehicle.

4. The method as claimed in claim 1, wherein the trip objective is received from a user associated with the vehicle, prior to initialization of a trip in the vehicle, and wherein the trip objective comprises at least one of a trip destination, a trip time, an average trip speed, details of the occupant, and pre-defined parameters.

5. The method as claimed in claim 1, wherein identifying the one or more unstated requirements of the occupant comprises:

detecting at least one cue pertaining to the occupant, based on the data, wherein the at least one cue is indicative of at least one of a behavioural parameter, a temporal parameter, and a conditional parameter; and determining the one or more unstated requirements of the occupant, based on the at least one cue.

6. The method as claimed in claim 1, wherein determining the one or more changes associated with the one or more operations of the vehicle comprises identifying the one or more changes from a pre-defined list of changes, retrieved from a memory associated with the occupant support system, for complying with the one or more unstated requirements, based on a predefined rule set.

7. The method as claimed in claim 6, wherein the predefined rule set is dynamically updated based on an assessment of a performance of the occupant support system.

8. An occupant support system of controlling operations of a vehicle based on requirements of occupants in the vehicle, the occupant support system comprising:

a processor; and a memory communicatively coupled to the processor, wherein the memory stores processor-executable instructions, which, on execution, cause the processor to:

receive data from a plurality of sources installed in the vehicle;

identify one or more unstated requirements of an occupant in the vehicle based on the data, wherein the one or more unstated requirements are identified based on a correlation of the data associated with each of the plurality of sources;

determine one or more changes associated with one or more operations of the vehicle, based on the one or more unstated requirements;

determine feasibility of implementing the one or more changes for controlling the one or more operations of the vehicle, based on a trip objective and one or more vehicle operation constraints; and control the one or more operations of the vehicle, based on the feasibility; and assess and improve performance of the occupant support system, based on the one or more changes performed in the vehicle by:

identifying one or more factors influencing the performance of the occupant support system, based on the one or more operations of the vehicle and the trip objective;

assessing the performance of the occupant support system, based on the one or more changes; and improving the performance of the occupant support system, based on the one or more factors, when the performance is less than a predefined threshold.

9. The occupant support system as claimed in claim 8, wherein the processor is configured to control the one or more operations of the vehicle by:

optionally identifying one or more stated requirements of the occupant; and controlling the one or more operations of the vehicle based on the one or more stated requirements.

10. The occupant support system as claimed in claim 9, wherein the one or more stated requirements are assessed for the feasibility of implementation in the vehicle prior to controlling the one or more operations of the vehicle.

11. The occupant support system as claimed in claim 8, wherein the processor is configured to receive a trip objective from a user associated with the vehicle, prior to initialization of a trip in the vehicle, and wherein the trip objective comprises at least one of a trip destination, a trip time, an average trip speed, details of the occupant, and a pre-determined parameter.

12. The occupant support system as claimed in claim 8, wherein the processor is configured to identify the one or more unstated requirements of the occupant by:

detecting at least one cue pertaining to the occupant, based on the data, wherein the at least one cue is indicative of at least one of a behavioural parameter, a temporal parameter, and a conditional parameter; and determining the one or more unstated requirements of the occupant, based on the at least one cue.

13. The occupant support system as claimed in claim 8, wherein the processor is configured to determine the one or more changes associated with the one or more operations of the vehicle by identifying the one or more changes from a pre-defined list of changes, retrieved from the memory, for complying with the one or more unstated requirements, based on a predefined rule set.

14. The occupant support system as claimed in claim 13, wherein the processor is configured to dynamically update the predefined rule set based on an assessment of a performance of the occupant support system.

15. A non-transitory computer readable medium including instruction stored thereon that when processed by at least one processor cause a quality determination system to perform operation comprising:

receiving, by an occupant support system associated with the vehicle, data from a plurality of sources installed in the vehicle;

identifying, by the occupant support system, one or more unstated requirements of an occupant in the vehicle based on the data, wherein the one or more unstated requirements are identified based on a correlation of the data associated with each of the plurality of sources;

determining, by the occupant support system, one or more changes associated with one or more operations of the vehicle, based on the one or more unstated requirements;

determining, by the occupant support system, feasibility of implementing the one or more changes for controlling the one or more operations of the vehicle, based on a trip objective and one or more vehicle operation constraints; and controlling, by the occupant support system, the one or more operations of the vehicle, based on the feasibility; and assessing and improving performance of the occupant support system, based on the one or more changes performed in the vehicle; wherein assessing and improving the performance of the occupant support system comprises:

identifying one or more factors influencing the performance of the occupant support system, based on the one or more operations of the vehicle and the trip objective;

assessing the performance of the occupant support system, based on the one or more changes; and improving the performance of the occupant support system, based on the one or more factors, when the performance is less than a predefined threshold.

* * * * *